US012670411B2

(12) United States Patent
Min et al.

(10) Patent No.: US 12,670,411 B2
(45) Date of Patent: Jun. 30, 2026

(54) LEARNING METHOD OF MODEL AND COMPUTER-READABLE RECODING MEDIUM FOR STORING PROGRAM FOR PERFORMING THE LEARNING METHOD

(71) Applicants: HYUNDAI MOTOR COMPANY, Seoul (KR); KIA CORPORATION, Seoul (KR); Seoul National University R&DB Foundation, Seoul (KR)

(72) Inventors: Jaesik Min, Seongnam-si (KR); Kyoung Mu Lee, Seoul (KR); Sungyong Baik, Seoul (KR); Janghoon Choi, Seoul (KR); Heewon Kim, Seoul (KR); Dohee Cho, Gyeonggi-do (KR)

(73) Assignees: HYUNDAI MOTOR COMPANY, Seoul (KR); Kia Corporation, Seoul (KR); Seoul National University R&DB Foundation, Seoul (KR)

( * ) Notice: Subject to any disclaimer, the term of this patent is extended or adjusted under 35 U.S.C. 154(b) by 810 days.

(21) Appl. No.: 18/081,902

(22) Filed: Dec. 15, 2022

(65) Prior Publication Data

US 2024/0037411 A1 Feb. 1, 2024

(30) Foreign Application Priority Data

Jul. 28, 2022 (KR) ........................ 10-2022-0094261

(51) Int. Cl.
*G06N 3/0985* (2023.01)
(52) U.S. Cl.
CPC .................................. *G06N 3/0985* (2023.01)

(58) Field of Classification Search
None
See application file for complete search history.

(56) References Cited

U.S. PATENT DOCUMENTS

| 2019/0147298 | A1* | 5/2019 | Rabinovich | ............ | G06N 3/084 |
| | | | | | 382/157 |
| 2019/0197360 | A1* | 6/2019 | Kraus | ..................... | G06N 3/084 |
| 2020/0160212 | A1* | 5/2020 | Shin | ..................... | G06N 3/0985 |
| 2021/0006760 | A1* | 1/2021 | Mcdonagh | ............... | G06N 3/08 |
| 2021/0256387 | A1* | 8/2021 | Chopra | ................ | G06N 3/0464 |

(Continued)

FOREIGN PATENT DOCUMENTS

| JP | 2021523449 A | 9/2021 |
| KR | 10-2021-0081518 A | 7/2021 |

OTHER PUBLICATIONS

T. Hospedales, A. Antoniou, P. Micaelli and A. Storkey, "Meta-Learning in Neural Networks: A Survey," in IEEE Transactions on Pattern Analysis and Machine Intelligence, vol. 44, No. 9, pp. 5149-5169, Sep. 1, 2022, doi: 10.1109/TPAMI.2021.3079209. (Year: 2021).*

(Continued)

*Primary Examiner* — Omar F Fernandez Rivas
*Assistant Examiner* — Corey M Sackalosky
(74) *Attorney, Agent, or Firm* — Morgan, Lewis & Bockius LLP

(57) ABSTRACT

A method for training a model using a meta-learning includes training a base learning model; training a loss meta-learning model used as a loss function of the base learning model for each task; and training a meta-learning model used to optimize a parameter of the loss meta-learning model.

18 Claims, 11 Drawing Sheets

100

110 120

(56) References Cited

U.S. PATENT DOCUMENTS

2023/0023812 A1\* 1/2023 Sun .......................... G01V 1/50

OTHER PUBLICATIONS

Hospedales, T.M., Antoniou, A., Micaelli, P., & Storkey, A.J. (2020). Meta-Learning in Neural Networks: A Survey. IEEE Transactions on Pattern Analysis and Machine Intelligence, 44, 5149-5169. (Year: 2020).\*

Bechtle, Sarah & Molchanov, Artem & Chebotar, Yevgen & Grefenstette, Edward & Righetti, Ludovic & Sukhatme, Gaurav & Meier, Franziska. (2021). Meta Learning via Learned Loss. 4161-4168. 10.1109/ICPR48806.2021.9412010. (Year: 2021).\*

Barron, "A General and Adaptive Robust Loss Function", Computer Vision Foundation, pp. 4331-4339.

\* cited by examiner

<u>100</u> base learner parameters $\theta$

Figure 4:
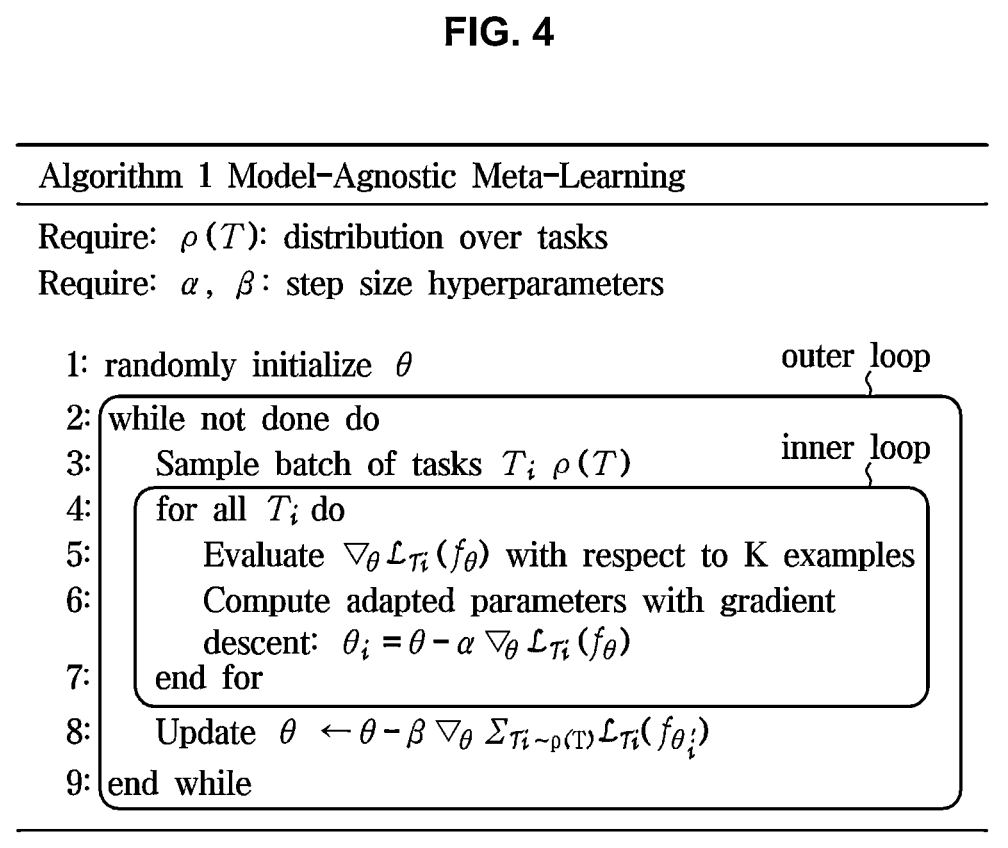

Algorithm 1 Model-Agnostic Meta-Learning

---

Require: $p(T)$: distribution over tasks
Require: $\alpha$, $\beta$: step size hyperparameters 1: randomly initialize $\theta$                                outer loop
2: while not done do
3:     Sample batch of tasks $T_i$ $p(T)$                 inner loop
4:     for all $T_i$ do
5:         Evaluate $\nabla_\theta \mathcal{L}_{T_i}(f_\theta)$ with respect to K examples
6:         Compute adapted parameters with gradient
           descent: $\theta_i = \theta - \alpha \nabla_\theta \mathcal{L}_{T_i}(f_\theta)$
7:     end for
8:     Update $\theta \leftarrow \theta - \beta \nabla_\theta \sum_{T_i \sim p(T)} \mathcal{L}_{T_i}(f_{\theta_i})$
9: end while

Figure 5:
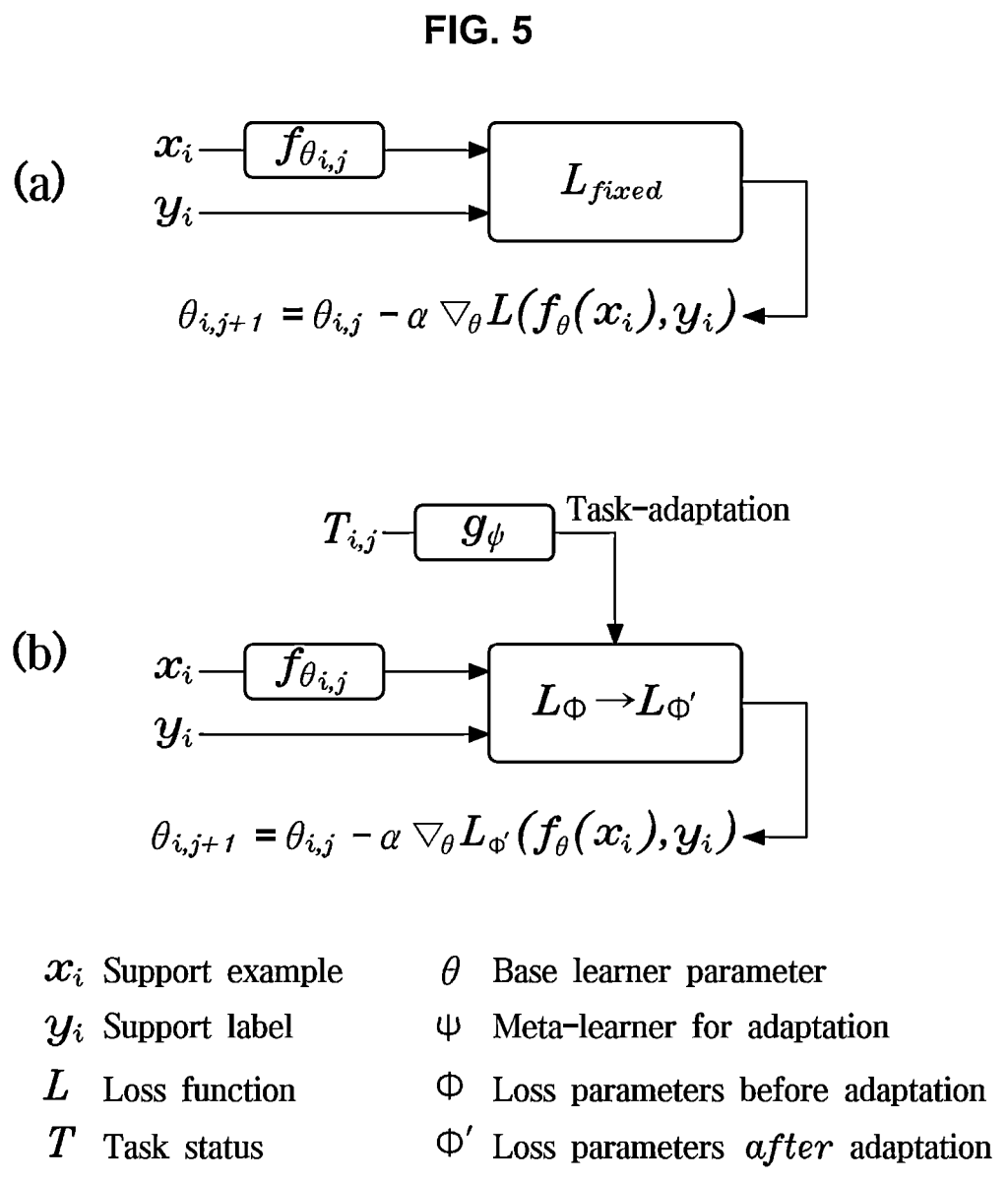

$$x_i - \boxed{f_{\theta_{i,j}}} \longrightarrow \boxed{L_{fixed}}$$

$$y_i \longrightarrow$$

$$\theta_{i,j+1} = \theta_{i,j} - \alpha \nabla_\theta L(f_\theta(x_i), y_i)$$

(b)

$$T_{i,j} - \boxed{g_\psi} \quad \text{Task-adaptation}$$

$$x_i - \boxed{f_{\theta_{i,j}}} \longrightarrow \boxed{L_\Phi \to L_{\Phi'}}$$

$$y_i \longrightarrow$$

$$\theta_{i,j+1} = \theta_{i,j} - \alpha \nabla_\theta L_{\Phi'}(f_\theta(x_i), y_i)$$

| | | | |
|---|---|---|---|
| $x_i$ | Support example | $\theta$ | Base learner parameter |
| $y_i$ | Support label | $\psi$ | Meta-learner for adaptation |
| $L$ | Loss function | $\Phi$ | Loss parameters before adaptation |
| $T$ | Task status | $\Phi'$ | Loss parameters *after* adaptation |

Figure 7:
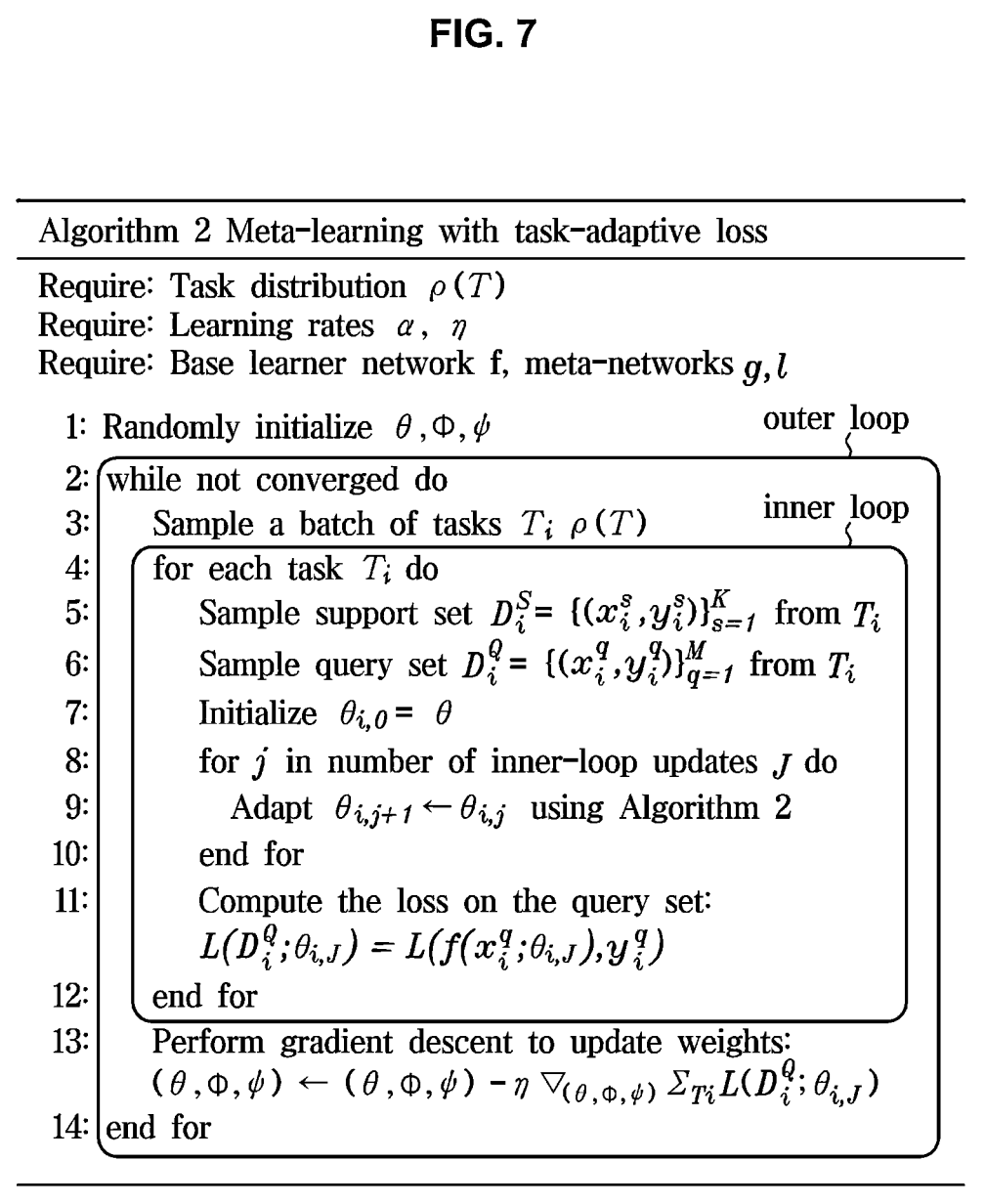

Algorithm 2 Meta-learning with task-adaptive loss

---

Require: Task distribution $\rho(T)$
Require: Learning rates $\alpha$, $\eta$
Require: Base learner network f, meta-networks $g, l$ 1: Randomly initialize $\theta, \Phi, \psi$                          outer loop 2: while not converged do
3:     Sample a batch of tasks $T_i$ $\rho(T)$          inner loop
4:     for each task $T_i$ do
5:         Sample support set $D_i^S = \{(x_i^s, y_i^s)\}_{s=1}^K$ from $T_i$
6:         Sample query set $D_i^Q = \{(x_i^q, y_i^q)\}_{q=1}^M$ from $T_i$
7:         Initialize $\theta_{i,0} = \theta$
8:         for $j$ in number of inner-loop updates $J$ do
9:             Adapt $\theta_{i,j+1} \leftarrow \theta_{i,j}$ using Algorithm 2
10:         end for
11:         Compute the loss on the query set:
           $L(D_i^Q; \theta_{i,J}) = L(f(x_i^q; \theta_{i,J}), y_i^q)$
12:     end for
13:     Perform gradient descent to update weights:
        $(\theta, \Phi, \psi) \leftarrow (\theta, \Phi, \psi) - \eta \nabla_{(\theta, \Phi, \psi)} \Sigma_{T_i} L(D_i^Q; \theta_{i,J})$
14: end for

Algorithm 3 Inner-loop update subroutine

---

Require: Weights $\theta_{i,j}$ of the base learner $f$

Require: Meta-networks $g$, $l$ with parameters

Require: Support set examples $D_i^S$

Require: Unlabeled query set examples
  $\{x_i^q\}_{q=1}^M$ if semisupervised setting 1: Compute the base learner output on the support set
  $$f(x_i^{s=1:K};\theta_{i,j}) = \{f(x_i^s;\theta_{i,j})\}_{s=1}^K$$

2: Compute the loss on the support set:
  $$L(D_i^S;\theta_{i,j}) = L(f(x_i^{s=1:K};\theta_{i,j}), y_i^s)$$

3: Compute the task state:

4: if supervised then

5:   $\tau_{i,j} = [L(D_i^S;\theta_{i,j}), \theta_{i,j}, \{f(x_i^{s=1:K};\theta_{i,j})\}_{s=1}^K]$ 6: else if semi-supervised then

7:   Compute the base learner output on the query set
  $$f(x_i^{q=1:M};\theta_{i,j}) = \{f(x_i^q;\theta_{i,j})\}_{s=1}^K$$

8:   $\tau_{i,j} = [L(D_i^S;\theta_{i,j}), \theta_{i,j},$
  $$f(x_i^{s=1:M};\theta_{i,j}), f(x_i^{q=1:M};\theta_{i,j})]$$

9: end if

10: Compute the affine transformation parameters:
  $$r_{i,j}, \beta_{i,j} = g(\tau_{i,j};\psi)$$

11: Adapt the loss function parameters:
  $$\Phi'_{i,j} = r_{i,j}\Phi + \beta_{i,j}$$

12: Compute task-adaptive loss: $L_{\Phi'_{i,j}}(\tau_{i,j})$

13: Perform gradient descent to adapt $f$ to $T_j$:
  $$\theta_{i,j+1} = \theta_{i,j} - \alpha \nabla_{\theta_{i,j}} L_{\Phi'_{i,j}}(\tau_{i,j})$$

|  | Base learner Backbone | miniImageNet →CUB |
|---|---|---|
| COMPARATIVE EXAMPLE 1 | 4-CONV | 52.70 ± 0.32% |
| EXAMPLE 1 | 4-CONV | 58.20 ± 0.24% |
| COMPARATIVE EXAMPLE 2 | ResNet12 | 53.83 ± 0.32% |
| EXAMPLE 2 | ResNet12 | 61.29 ± 0.21% |

FIG. 10

|  | 5 shots | 10 shots | 20 shots |
|---|---|---|---|
| COMPARATIVE EXAMPLE 3 | 0.86 ± 0.23 | 0.50 ± 0.12 | 0.26 ± 0.08 |
| EXAMPLE 3 | 0.74 ± 0.18 | 0.44 ± 0.11 | 0.21 ± 0.06 |

FIG. 11

|  | Task-adaptive | semi-supervised | accuracy |
|---|---|---|---|
| COMPARATIVE EXAMPLE 4 |  |  | 67.42 ± 0.34% |
| EXAMPLE 4 | ✔ |  | 68.56 ± 0.36% |
| COMPARATIVE EXAMPLE 5 |  | ✔ | 68.24 ± 0.31% |
| EXAMPLE 5 | ✔ | ✔ | 70.52 ± 0.29% |

FIG. 14
200
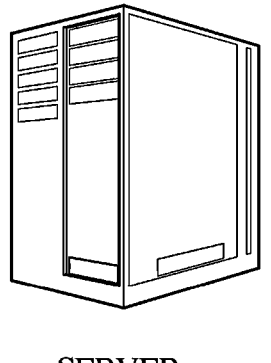
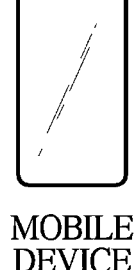
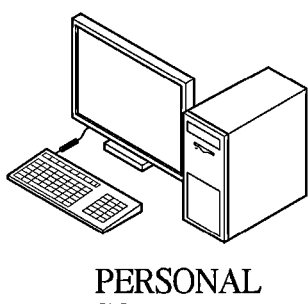
SERVER
MOBILE
DEVICE
PERSONAL
COMPUTER

LEARNING METHOD OF MODEL AND COMPUTER-READABLE RECODING MEDIUM FOR STORING PROGRAM FOR PERFORMING THE LEARNING METHOD

CROSS-REFERENCE TO RELATED APPLICATION(S)

The present application claims priority to Korean Patent Application No. 10-2022-0094261, filed on Jul. 28, 2022, the entire contents of which is incorporated herein for all purposes by this reference.

BACKGROUND OF THE PRESENT DISCLOSURE

Field of the Present Disclosure

The present disclosure relates to a learning method for training a model using meta-learning, and a computer-readable recording medium in which a program for executing the learning method is stored.

Description of Related Art

Deep learning generally requires the collection and labeling of large amounts of training data. Collecting and labeling such data consumes a lot of money and time, and it is sometimes difficult to obtain a sufficient amount of data due to the nature of a task.

If a model is trained with only a small amount of data, overfitting problem may occur, where a model works well only on the data used for training and does not work well on new data.

Therefore, it is necessary to research a learning method that can secure the performance of the model without overfitting even with a small amount of data. One of these researches is a few-shot learning. The few-shot learning is a method to train a model that performs meaningfully even with a small amount of data.

On the other hand, to make the few-shot learning model trained with a small amount of data work well even with newly given data, meta-learning, which is a method of learning how to learn (learn-to-learn), may be applied.

The information included in the present Background of the present disclosure section is only for enhancement of understanding of the general background of the present disclosure and may not be taken as an acknowledgement or any form of suggestion that the present information forms the prior art already known to a person skilled in the art.

BRIEF SUMMARY

Various aspects of the present disclosure are directed to providing a learning method applicable regardless of a model among meta-learning methods, and provides a learning method that can obtain a model optimized for each task by applying a different loss function for each given task, and a recording medium in which a program for executing the learning method is stored.

A method for training a model using a meta-learning according to an exemplary embodiment of the present disclosure includes training a base learning model; training a loss meta-learning model used as a loss function of the base learning model for each task; and training a meta-learning model used to optimize a parameter of the loss meta-learning model.

The training the base learning model may include training the base learning model by use of the loss meta-learning model trained for each task as the loss function.

The training the base learning model may include generating output data of the base learning model by inputting input data of a support set to the base learning model; and defining a task state based on the output data of the base learning model and target output data of the support set.

The training the loss meta-learning model for each task may include generating output data of the meta-learning model by inputting the task state to the meta-learning model; updating the parameter of the loss meta-learning model by use of the output data of the meta-learning model.

The training the base learning model may include determining a loss value by inputting the task state to the loss meta-learning model in which the parameter is updated; and updating a parameter of the base learning model in a direction of minimizing the determined loss value.

The updating the loss meta-learning model may include using an affine transformation, and the output data of the meta-learning model includes affine transformation parameters.

The training the base learning model and the training the loss meta-learning model for each task may be included in an internal loop, and the training the meta learning model may be included in an external loop.

The training the meta-learning model may include generating the output data of the base learning model by inputting input data of a query dataset to the base learning model for each task in response to a parameter of the base learning model being updated a predetermined number of times; and determining an elementary loss value based on the output data of the base learning model for each task.

The training the meta-learning model may include summing the elementary loss value determined for each task, and updating the parameter of the base learning model, the parameter of the loss meta-learning model, and a parameter of the meta-learning model in a direction of minimizing the summed elementary loss value.

The loss meta-learning model may include multi-layer perception.

In a computer-readable recording medium in which a program for executing a method for training a model using a meta-learning is stored, the method includes training a base learning model; training a loss meta-learning model used as a loss function of the base learning model for each task; and training a meta-learning model used to optimize a parameter of the loss meta-learning model.

The training the base learning model may include training the base learning model by use of the loss meta-learning model trained for each task as the loss function.

The training the base learning model may include generating output data of the base learning model by inputting input data of a support set to the base learning model; and defining a task state based on the output data of the base learning model and target output data of the support set.

The training the loss meta-learning model for each task may include generating output data of the meta-learning model by inputting the task state to the meta-learning model; updating the parameter of the loss meta-learning model by use of the output data of the meta-learning model.

The training the base learning model may include determining a loss value by inputting the task state to the loss meta-learning model in which the parameter is updated; and updating a parameter of the base learning model in a direction of minimizing the determined loss value.

The updating the loss meta-learning model may include using an affine transformation, and the output data of the meta-learning model includes affine transformation parameters.

The training the base learning model and the training the loss meta-learning model for each task may be included in an internal loop, and the training the meta learning model may be included in an external loop.

The training the meta-learning model may include generating the output data of the base learning model by inputting input data of a query dataset to the base learning model for each task in response to a parameter of the base learning model being updated a predetermined number of times; and determining an elementary loss value based on the output data of the base learning model for each task.

The training the meta-learning model may include summing the elementary loss value determined for each task, and updating the parameter of the base learning model, the parameter of the loss meta-learning model, and a parameter of the meta-learning model in a direction of minimizing the summed elementary loss value.

The loss meta-learning model may include multi-layer perception.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a diagram illustrating an algorithm applied to meta-learning.

FIG. 5 is a diagram schematically illustrating a difference between an algorithm used in a learning apparatus according to an exemplary embodiment and an existing algorithm.

FIG. 7 and FIG. 8 are diagrams illustrating an algorithm applied to a method for learning a model using meta-learning according to an exemplary embodiment of the present disclosure.

FIG. 9, FIG. 10 and FIG. 11 are tables illustrating performance test results of a model trained by a learning method according to an exemplary embodiment of the present disclosure.

FIG. 14 is a diagram illustrating an example of an electronic device according to an exemplary embodiment of the present disclosure.

Figure 1:
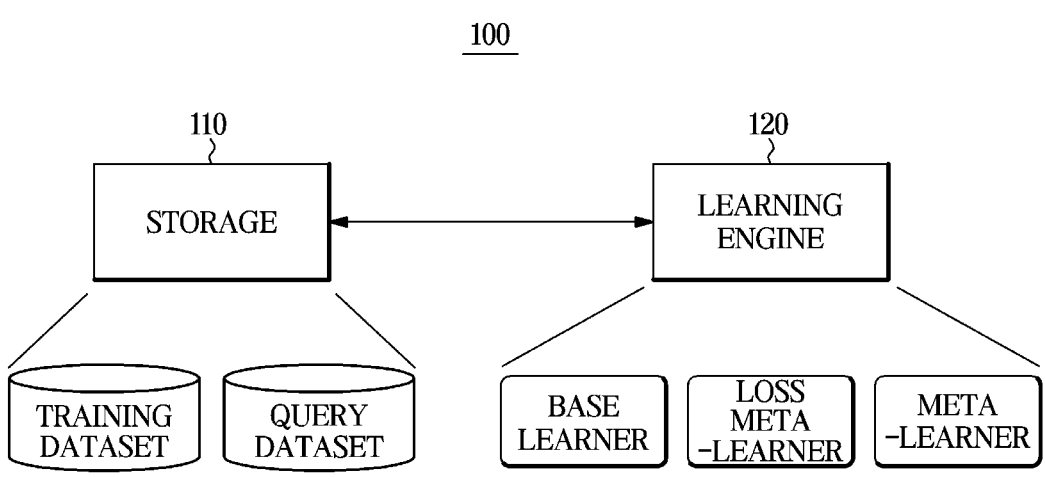
FIG. 1 is a block diagram illustrating an operation of a learning apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments, it will be understood that the present description is not intended to limit the present disclosure(s) to those exemplary embodiments of the present disclosure. On the other hand, the present disclosure(s) is/are intended to cover not only the exemplary embodiments, but also various alternatives, modifications, equivalents and other embodiments, which may be included within the spirit and scope of the present disclosure as defined by the appended claims.

Embodiments described in the present specification and configuration illustrated in the drawings are exemplary embodiments of the present disclosure, and there may be various modifications which may replace the exemplary embodiments of the present specification and the drawings at the time of filing the present application.

Furthermore, the terminology used herein is used to describe embodiments, and is not intended to limit and/or restrict the present disclosure. The singular expression includes the plural expression unless the context clearly dictates otherwise.

In the specification, terms such as "include", "comprise" or "have" are intended to designate the presence of the features, figures, steps, operations, components, parts, or combinations thereof described in the specification exist, but do not preclude in advance the possibility of the presence or addition of one or more other features, figures, steps, operations, components, parts, or combinations thereof.

Furthermore, terms such as "unit", "part", "block", "member" and "module" may indicate a unit of processing at least one function or operation. For example, the terms may indicate at least one process processed by at least one hardware such as Field Programmable Gate Array (FPGA), and Application Specific Integrated Circuit (ASIC), at least one software stored in a memory or a processor.

Furthermore, ordinal numbers such as "first" and "second" used before the components described herein are merely used to distinguish the components from each other, and are not used to specify the order of connection between these components, the order of use thereof, any different meaning, such as priority.

The references attached to the steps are used to identify the steps. These references do not indicate the order between the steps. Each step may be performed in a different order than the stated order unless the context clearly indicates a specific order.

In the specification, expressions such as "at least one of," when preceding a list of components, may modify the combination of components. For example, the expression, "at least one of a, b, or c," may be understood as including only a, only b, only c, both a and b, both a and c, both b and c, or all of a, b, and c.

Hereinafter, embodiments of the present disclosure will be described in detail with reference to the accompanying drawings.

FIG. 1 is a block diagram illustrating an operation of a learning apparatus according to an exemplary embodiment of the present disclosure.

Referring to FIG. 1, a learning apparatus 100 according to an exemplary embodiment of the present disclosure includes a storage 110 that stores training data and query data and a learning engine 120 that trains a model using the stored training data and query data.

The learning engine 120 may include at least one memory in which a program for executing operations to be described later is stored and at least one processor executing the stored program.

For example, the processor may include a central processing unit (CPU), a graphic processing unit (GPU), or a combination of a CPU and a GPU. The memory may include a dynamic random access memory (DRAM) or a high bandwidth memory (HBM).

The storage 110 may include a memory that non-temporarily or temporarily stores data. The storage 110 may share a memory with the learning engine 120 or use a separate memory.

The learning apparatus 100 according to various exemplary embodiments of the present disclosure may train a model using meta-learning. Meta-learning may be defined as a method of learning how to learn (learn-to-learn), and is a method of learning how to process tasks well even in an environment where only a small amount of data is given.

Therefore, the learning engine 120 may perform a base learning model that processes tasks and a meta-learning model that learns how the base learning model learns. In an exemplary embodiment to be described later, the base learning model and the meta-learning model may be referred to as a base learner and a meta-learner, respectively.

Furthermore, the learning apparatus 100 according to various exemplary embodiments of the present disclosure may apply a different loss function to each task in training a model using meta-learning. That is, in the learning engine 120, a loss meta-learning model (also referred to as a loss meta-learner) may perform learning for each task, and the loss meta-learning model trained for each task may function as a loss function for each task. Each learning model may be implemented as a neural network.

Figure 2:
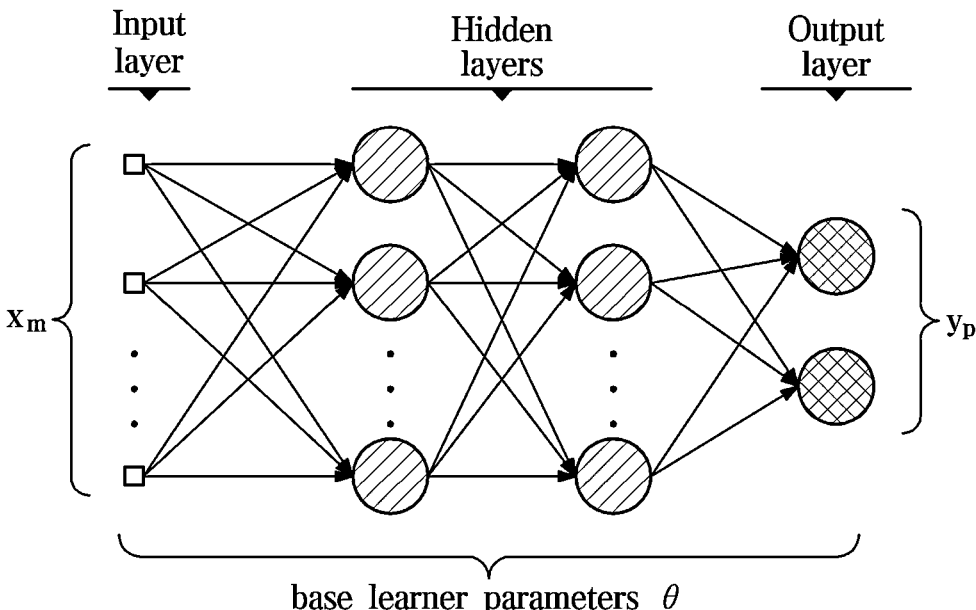
FIG. 2 and FIG. 3 are diagrams schematically illustrating a meta-learning method applied to a learning apparatus according to an exemplary embodiment of the present disclosure.
Figure 3:
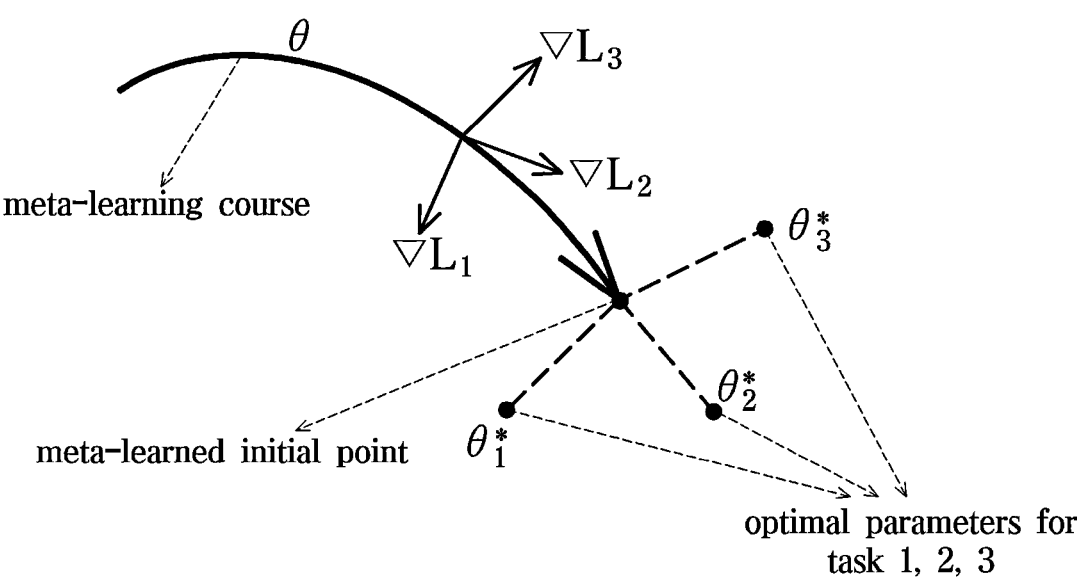

FIG. 2 and FIG. 3 are diagrams schematically illustrating a meta-learning method applied to a learning apparatus according to an exemplary embodiment of the present disclosure. FIG. 4 is a diagram illustrating an algorithm applied to meta-learning.

As illustrated in FIG. 2, a model for performing learning in the learning apparatus 100 according to an exemplary embodiment of the present disclosure is a deep learning model including a plurality of hidden layers together with an input layer and an output layer.

After the learning in the learning apparatus 100 is completed, what is used in the inference process corresponds to the base learning model, and the purpose of the learning performed in the learning apparatus 100 is to optimize a parameter θ of the base learning model.

The learning apparatus 100 according to various exemplary embodiments of the present disclosure may be based on a Model-Agnostic Meta-Learning (MAML) method which may be applied regardless of the type of the model of the base learner among various learning methods by meta-learning.

As illustrated in FIG. 3, the meta-learning applied to the learning apparatus 100 according to various exemplary embodiments of the present disclosure may be expressed as a process of obtaining an optimal initial value of a parameter θ for searching for optimal parameter values (θ1\*, θ2\*, θ3\*) for task 1, task 2, and task 3, respectively.

The above-described process may be represented by an algorithm of FIG. 4. Referring to FIG. 4, the MAML algorithm may include an internal loop in which the base learner performs learning and an external loop in which the meta-learner performs learning.

$p(T)$ represents a task given a small amount of data, and α and β are hyperparameters representing step sizes.

In the internal loop, the parameter θ of the base leaner f is set arbitrarily, the loss function $\mathcal{L} T_i(f_\theta)$ is determined for each task Ti, and the parameter θ is optimized in the direction of minimizing the loss value according to the gradient descent to generate $\theta'_i$ for each task. In the instant case, K training datasets may be used.

In the external loop, a loss value for each task is determined by applying the parameter $\theta'_i$ for each task to the query dataset, and the parameter θ may be optimized so that the determined loss value is minimized.

The parameter of the base leaner f may be updated by the parameter optimized in the external loop, and the double loop of the present process may be repeatedly performed.

FIG. 5 is a diagram schematically illustrating a difference between an algorithm used in a learning apparatus according to an exemplary embodiment and an existing algorithm.

The learning engine 120 according to an exemplary embodiment has an algorithm in which a double loop including an internal loop and an external loop is repeatedly performed like the above algorithm, but has a difference in the loss function used to optimize the parameters of the base leaner as illustrated in FIG. 5.

In the above-described algorithm, as illustrated in (a) of FIG. 5, the loss functions L used for the respective tasks are all fixed as a cross-entropy function.

However, the algorithm used by the learning engine 120 according to an exemplary embodiment to train the model may implement the learning optimized for each task by applying a loss function each task differently as illustrated in (b) of FIG. 5.

The loss function for each task may be implemented as a deep learning model generated by learning, and the parameter φ of the loss function may be optimized as φ' by the meta leaner g.

The meta leaner g is a deep learning model with a task state τ as input and a parameter ψ. The parameter ψ of the meta leaner g may be updated in the external loop.

Hereinafter, a method for training a model using meta-learning according to an exemplary embodiment will be described.

The method for training a model using meta-learning according to various exemplary embodiments of the present disclosure may be performed by the learning apparatus 100 according to an exemplary embodiment of the present disclosure. Accordingly, the description of the learning apparatus 100 may be equally applied to the method for training a model using meta-learning according to an exemplary embodiment of the present disclosure, even if there is no separate mention.

Conversely, a description of a method for training a model using meta-learning according to various exemplary embodiments of the present disclosure may be equally applied to the learning apparatus 100 even if there is no separate mention.

The method for training a model using meta-learning according to various exemplary embodiments of the present disclosure may include training a base learning model, training a loss meta-learning model for each task, and training a meta-learning model.

As described above, in the method for training a model using meta-learning according to an exemplary embodiment of the present disclosure, an internal loop and an external loop are repeatedly performed, and a loss meta-learning model is used as a loss function of the base learning model.

Therefore, the steps of training the base learning model, training the loss meta-learning model for each task, and training the meta-learning model are not separate steps independently of each other, but some or all of one step may be included in another step, or some or all of each step may be repeatedly performed.

Furthermore, it is obvious that training does not have to be performed in the order of the step of training the base learning model, the step of training the loss meta-learning model for each task, and the step of training the meta-learning model.

Figure 6:
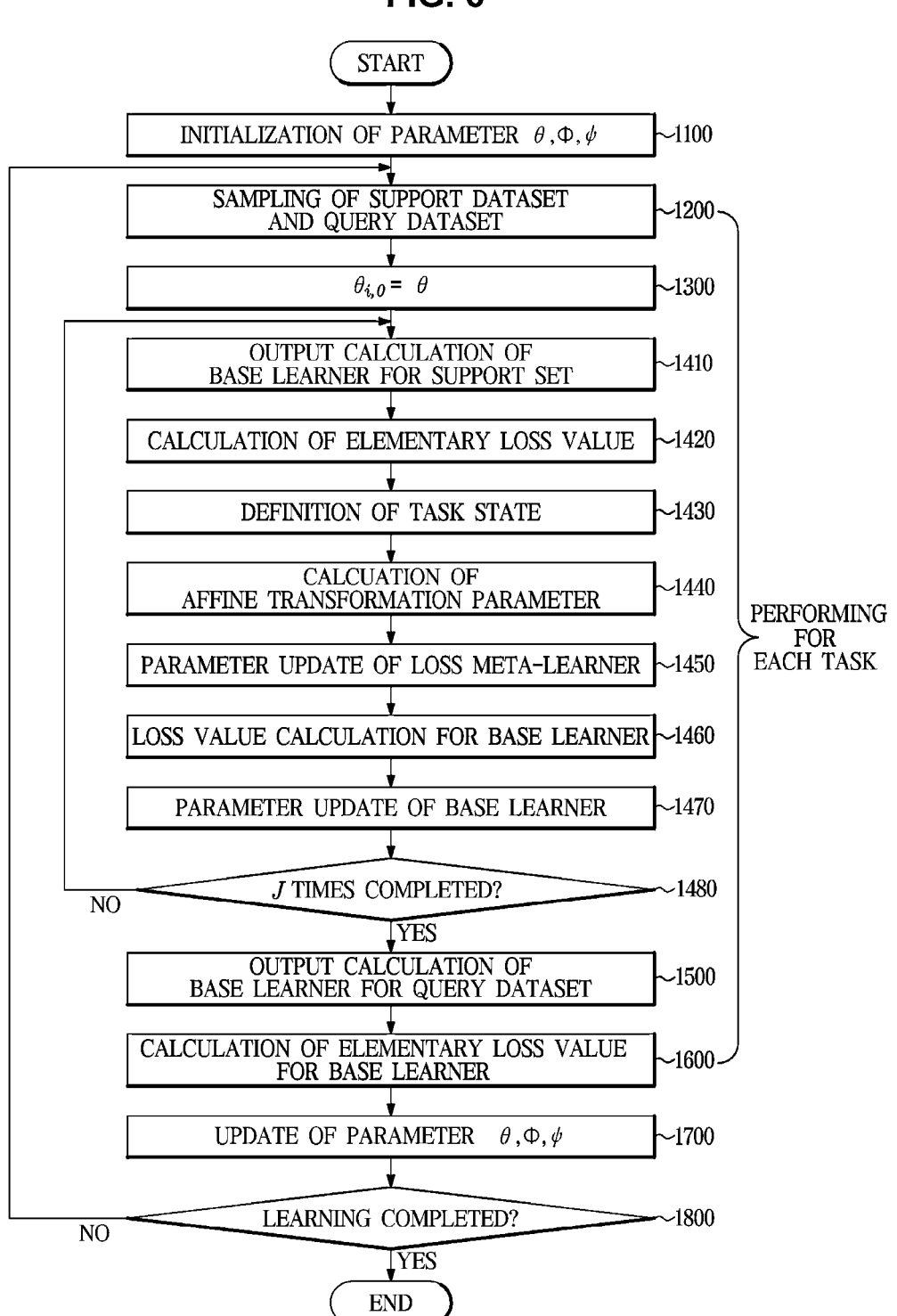
FIG. 6 is a flowchart illustrating a method for learning a model using meta-learning according to an exemplary embodiment of the present disclosure.

FIG. 6 is a flowchart illustrating a method for learning a model using meta-learning according to an exemplary embodiment of the present disclosure. FIG. 7 and FIG. 8 are diagrams illustrating an algorithm applied to a method for learning a model using meta-learning according to an exemplary embodiment of the present disclosure.

Hereinafter, an exemplary embodiment of a method for training a model using meta-learning will be described in detail with reference to the above-described description of the learning apparatus 100, the flowchart of FIG. 6, and the algorithm of FIGS. 7 and 8.

The training dataset and a query dataset stored in the storage 110 may be used in a method for training a model using meta-learning according to an exemplary embodiment of the present disclosure. In the meta-learning, the training dataset may also be referred to as a support dataset, and the query dataset may also be referred to as a test dataset. Regardless of the name referred to, any dataset used in the process described below may be included in the scope of the present disclosure.

For each task, K support datasets (K is an integer greater than or equal to 1) and M query datasets (M is an integer greater than or equal to 1) may be provided for learning.

The model trained by the learning method according to various exemplary embodiments of the present disclosure may be applied to a plurality of tasks. For example, each of the tasks may be a classification task for classifying a category of an input image, and a category classified for each task may be different.

The task distribution may be expressed as p(T), and a set of task $T_i$ is obtained from the task distribution p(T) may be expressed as $$\{T_i\}_{i=1.}^T \alpha$$

and η represent a learning rate or a step size.

Each task $T_i$ includes a support dataset $D_i^S$ and a query dataset $D_i^Q$, and each dataset includes an input x and an output y, and may be expressed as $$D_i^S = \{(x_i^s, y_i^s)\}_{s=1}^K$$

and $$D_i^Q = \{(x_i^q, y_i^q)\}_{q=1}^M.$$

Furthermore, the base leaner is represented by f, the loss meta-learner by l, and the meta-learner by g, the parameter of the base learner f is represented by θ, the parameter of the loss meta-learner l is represented by φ, and the parameter of the meta-learner g is represented by ψ.

In the method for training a model using meta-learning according to an exemplary embodiment of the present disclosure, as illustrated in FIG. 6 and FIG. 7, first, the parameter θ of the base learner f, the parameter φ of the loss meta-learner l, and the parameter ψ of the meta-learner g are respectively initialized to an arbitrary value (1100).

N tasks $T_i$ (N is an integer greater than or equal to 2) are sampled from the entire task distribution p(T), and the following operations may be performed for each task $T_i$.

A support dataset $D_i^S$ and a query dataset $D_i^Q$ are sampled from the task $T_i$ (1200).

The parameter $\theta_{i,0}$ of the base learner f is set to an arbitrarily initialized θ (1300), and the subroutine of the internal loop for updating the parameter θ of the base learner f to $\theta_{i,j+1} \leftarrow \theta_{i,j}$ may be performed as follows.

Referring to FIG. 6 and FIG. 8 together, the output of the base learner in response to the input of the support dataset is determined (1410).

The operation may be expressed as [Equation 1] below.

$$f\left(x_i^{s=1:K}; \theta_{i,j}\right) = \{f(x_i^s; \theta_{i,j})\}_{s=1}^K \qquad \text{[Equation 1]}$$

Here, j may represent the number of times or time steps the parameter θ is updated in the internal loop and starts from 0.

An elementary loss value is determined using the output of the base learner and the target output (1420).

An elementary loss function L is a crossentropy function and may be expressed as [Equation 2] below.

$$\mathcal{L}(D_i^S; \theta_{i,j}) = \mathcal{L}(f(x_i^{s=1:K}; \theta_{i,j}), y_i^s) \qquad \text{[Equation 2]}$$

A task state is defined based on the determined elementary loss value (1430).

The task state $\tau_{i,j}$ may be defined by a current elementary loss value, a current parameter value, and an output of a current base learner, which may be expressed by [Equation 3] below.

$$\tau_{i,j} = \left[\mathcal{L}(D_i^S; \theta_{i,j}), \theta_{i,j}, \{f(x_i^{s=1:K}; \theta_{i,j})\}_{s=1}^K\right] \qquad \text{[Equation 3]}$$

Furthermore, the learning method according to various exemplary embodiments of the present disclosure may allow the optimization in the internal loop to be performed up to semi-supervised learning by use of the input $x_i^q$ of an unlabeled query dataset.

In performing the semi-supervised learning, the output of the base learner on the query dataset may be determined. This may be expressed by [Equation 4] below, and the task state $\tau_{i,j}$ in the instant case may be defined by [Equation 5] below.

$$f\left(x_i^{q=1:M}; \theta_{i,j}\right) = \{f(x_i^q; \theta_{i,j})\}_{q=1}^M \qquad \text{[Equation 4]}$$

$$\tau_{i,j} = \left[\mathcal{L}(\mathcal{D}_i^S; \theta_{i,j}), \theta_{i,j}, f\left(x_i^{s=1:K}; \theta_{i,j}\right), f\left(x_i^{q=1:M}; \theta_{i,j}\right)\right] \qquad \text{[Equation 5]}$$

The internal loop optimization of the present semi-supervised learning method may maximize the advantages of transductive setting.

An affine transformation parameter is determined based on the task state determined as described above (1440).

The affine transformation parameter is a parameter used to adapt the parameter q of the loss function l applied to the base learner f. That is, in the learning method according to an exemplary embodiment of the present disclosure, the affine transform may be applied in adapting the parameters of the loss function without applying the gradient descent method generally used for parameter optimization.

In a case that a parameter is optimized by applying the gradient descent method, it generally takes a lot of time, and in a case that a gradient of a higher order is used, the amount of computation is greatly increased. When the affine transform is applied as in an exemplary embodiment of the present disclosure, it is possible to efficiently optimize the parameters of the loss function without a huge amount of computational burden.

The affine transformation parameters $\gamma_{i,j}$, $\beta_{i,j}$ may be determined by the meta-learner g as illustrated in [Equation 6] below.

$$\gamma_{i,j}, \beta_{i,j} = g(\tau_{i,j}; \psi) \qquad \text{[Equation 6]}$$

As defined in [Equation 6], the meta-learner g is defined by the parameter $\psi$, and in response to the input of task state $\tau_{i,j}$, the output may be an affine transformation parameter.

The meta-learner g may be implemented as a multi-layer perceptron, and a Rectified Linear Unit (ReLU) may be used as an activation function.

The parameters of the loss meta-learner are updated using the determined affine transformation parameters (1450).

As described above, the loss meta-learner l corresponds to the loss function of the base learner f and may be differently applied to each task by learning. As described above, the affine transformation is employed as a way to optimize the parameters of the loss meta-learner. The adaptation of parameters by affine transformation may be expressed by [Equation 7] below.

$$\phi'_{i,j} = \gamma_{i,j}\phi + \beta_{i,j} \qquad \text{[Equation 7]}$$

Because the parameter of the loss meta-learner has been adapted, a loss value for the base learner may be determined (1460).

To be distinguished from the elementary loss function previously used for defining the task state, the loss function for the base learner may be referred to as a task adaptive loss function.

Unlike the elementary loss function, which is a crossentropy function, the task adaptive loss function has a neural network structure trained by deep learning. As an exemplary embodiment of the present disclosure, the task adaptive loss function may be implemented as a multi-layer perceptron, and a rectified linear unit (ReLU) may be used as an activation function.

The task adaptive loss function defined by the parameter φ may output the loss value of the base learner in response to the input of the previously defined task state. The loss value at the j-th time step may be expressed as $\mathcal{L}_{\phi'_{i,j}}(\tau_{i,j})$.

Based on the determined loss value, the parameter of the base learner is updated (1470).

The gradient descent may be used to update the parameter of the base learner. The operation to update the parameter of the base learner may be expressed as [Equation 8] below.

$$\theta_{i,j+1} = \theta_{i,j} - \alpha \nabla_{\theta_{i,j}} \mathcal{L}_{\phi'_{i,j}}(\tau_{i,j}) \qquad \text{[Equation 8]}$$

According to the above-described process, the step for updating the parameter θ of the base learner f may be repeatedly executed J times (1480).

After the update of parameter θ is executed J times (Yes in 1480), the output of the base learner is determined for the input of the query dataset (1500), and the elementary loss value for the base learner is determined based on the determined output and output of the query dataset (1600).

The output of the base learner f in response to the input $x_i^q$ of the query dataset may be expressed as $f(x_i^q; \theta_{i,J})$, and the elementary loss value may be expressed as [Equation 9] below.

$$\mathcal{L}(\mathcal{D}_i^Q; \theta_{i,J}) = \mathcal{L}(f(x_i^q; \theta_{i,J}), y_i^q) \qquad \text{[Equation 9]}$$

All of the above processes may be performed for each of the sampled tasks. As expressed in [Equation 9], after determining the elementary loss value for each task in the J-th step, it is possible to exit the internal loop and enter the external loop.

All of the elementary loss values of [Equation 9] determined for each task may be summed, and the parameter θ of the base learner f, the parameter φ of the loss meta-learner l, and the parameter ψ of the meta-learner g may be updated based on the summed elementary loss values (1700).

For example, as expressed in [Equation 10] below, each parameter may be updated in a direction to minimize the summed elementary loss values by use of the gradient descent method.

$$(\theta, \phi, \psi) \leftarrow (\theta, \phi, \psi) - \eta \nabla_{(\theta, \phi, \psi)} \sum_i \tau_i \mathcal{L}(\mathcal{D}_i^Q; \theta_{i,J}) \qquad \text{[Equation 10]}$$

That is, in the internal loop, a parameter is optimized for each task, and in the external loop, the base learner may be generalized to work well with datasets that have not been experienced in the internal loop.

It also reduces the tendency of the bass learner to work well for only certain tasks, and implements optimizations that are averaged over the entire tasks.

Upon the updates of the parameter θ of the base learner f, the parameter φ of the loss meta-learner l, and the parameter ψ of the meta-learner g, the subroutines 1410 to 1480 of the internal loop for updating the parameter θ of the base learner f to $\theta_{i,j+1} \leftarrow \theta_{i,j}$ using the updated parameters may be performed.

Hereinafter, the performance test results of the model trained according to the above-described process will be described. Here, the model which is a target of the performance test may be a model corresponding to the base learner trained according to the above-described learning process.

For the performance test of the model, the loss meta-learner $L_{\varphi}$ and the meta-learner $g_{\psi}$, implemented by the multi-layer perceptron of two-layer and the activation function ReLu were used for learning of the base learner.

Furthermore, upon executing the internal loop, the parameter adaptation was performed in a semi-supervised learning method using both the labeled support dataset and the unlabeled query dataset.

In the following description, Comparative Example is a model represented by the algorithm of FIG. 4 described above, and Example is a model corresponding to the base learner trained according to a learning method according to an exemplary embodiment of the present disclosure.

FIG. 9, FIG. 10 and FIG. 11 are tables illustrating performance test results of a model trained by a learning method according to an exemplary embodiment of the present disclosure.

FIG. 9 is a table showing the training result of the model for a 5-way 5-shot cross-domain few-shot classification task. Here, 5-way 5-shot indicates that there are 5 classes and there are 5 training data (example) for each class.

The training of the model was performed by the miniImage Net meta training dataset, and evaluation was performed on the CUB meta test set.

Referring to FIG. 9, the test accuracies of Comparative Example 1 and Example 1 in which the backbone of the base learner was implemented with a 4-convolution neural network (CNN) were measured to be 52.70±0.32% and 28.20±0.24%, respectively.

Furthermore, the test accuracies of Comparative Example 2 and Example 2 in which the backbone of the base learner was implemented with ResNet12 were measured to be 53.83±0.32% and 61.29±0.21%, respectively.

Considering the test result of FIG. 9, it may be confirmed that the model trained by the learning method according to an exemplary embodiment has excellent performance even for a cross-domain few-shot classification task, which is a more difficult task than a general classification task.

FIG. 10 is a test result of applying Comparative Examples 3 and 3 to few-shot regression to prove the flexibility and applicability of the model trained by the learning method according to an exemplary embodiment of the present disclosure.

The neural network structure of the base learner of Comparative Example 3 and Example 3 consisted of three layers of size 80, and a nonlinear activation function ReLU was applied between the layers. The regression was performed by applying a single gradient descent method to the base learner.

The performances of Comparative Example 3 and Example 3 were expressed as a mean-square error (MSE) between an output value of the model and a target output value (ground truth output value).

Referring to the table of FIG. 10, for 5-shots regression, the MSE of Comparative Example 3 was measured to be 0.86±0.23, and the MSE of Example 3 was measured to be 0.74±0.18. For the 10-shots regression, the MSE of Comparative Example 3 was measured to be 0.50±0.12, and the MSE of Example 3 was measured to be 0.44±0.11. For 20-shots regression, the MSE of Comparative Example 3 was 0.26±0.08, and the MSE of Example 3 was 0.21±0.06.

Referring to the test results of FIG. 10, it may be confirmed that the error of Example 3 is lower than the error of Comparative Example 3 regardless of the number of shots, and the model trained by the learning method according to an exemplary embodiment can exhibit a consistent performance improvement over various conditions.

FIG. 11 illustrates a result of measuring the degree to which a feature of applying a different loss function each task and a feature of applying a semi-supervised learning method contribute to the performance of the model in performing the method for training a model according to an exemplary embodiment of the present disclosure.

Referring to FIG. 11, Comparative Example 4 is a model in which a base learner is trained using a fixed loss function, and may be a model expressed by the algorithm of FIG. 4 described above. Example 4 shows a model to which a supervised learning method is applied using a support dataset instead of a semi-supervised learning method upon training a base learner by the learning method according to an exemplary embodiment of the present disclosure.

Comparative Example 5 shows a model to which a semi-supervised learning method is applied while using a fixed loss function upon training the base learner, and Example 5 shows a modle trained by applying a loss function differently for each task and applying a semi-supervised method according to the learning method according to an exemplary embodiment of the present disclosure.

Referring to FIG. 11, the accuracy for Comparative Example 4 was measured to be 67.42±0.34%, the accuracy for Example 4 was measured to be 68.56±0.36%, the accuracy for Comparative Example 5 was measured to be 68.24±0.31%, and the accuracy for Example 5 was measured to be 70.52±0.29%.

Referring to the test results of FIG. 11, the method to which both the feature of applying the loss function differently for each task and the feature of applying the semi-supervised method were applied was compared with the method not to which both features were applied (Comparative Example 5 vs. Example 5, Example 4 vs. Example 5), and it can confirmed that better performance may be secured upon applying both the feature of applying the loss function differently for each task and the feature of applying the semi-supervised method.

Furthermore, it may be confirmed that the best performance is secured upon applying the feature of applying a different loss function for each task and the feature of applying the semi-supervised method together.

Figure 12:
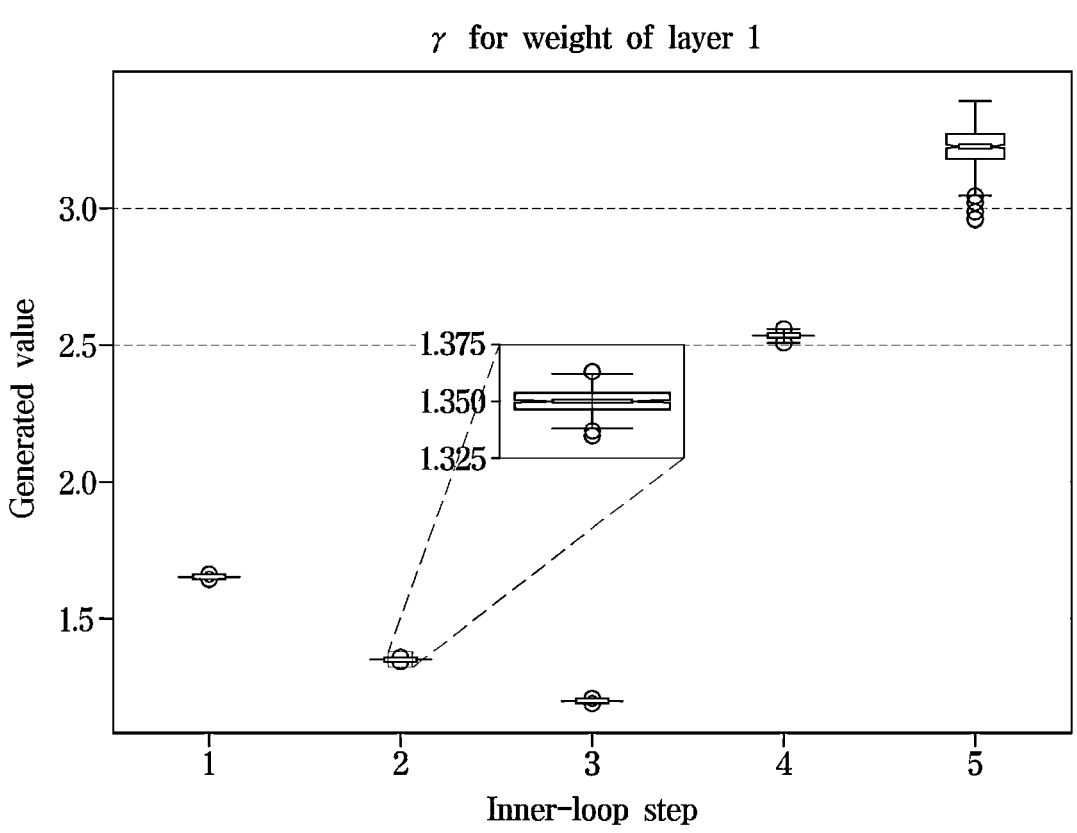
FIG. 12, and FIG. 13 are graphs illustrating affine transformation parameters generated by a learning method according to an exemplary embodiment of the present disclosure.
Figure 13:
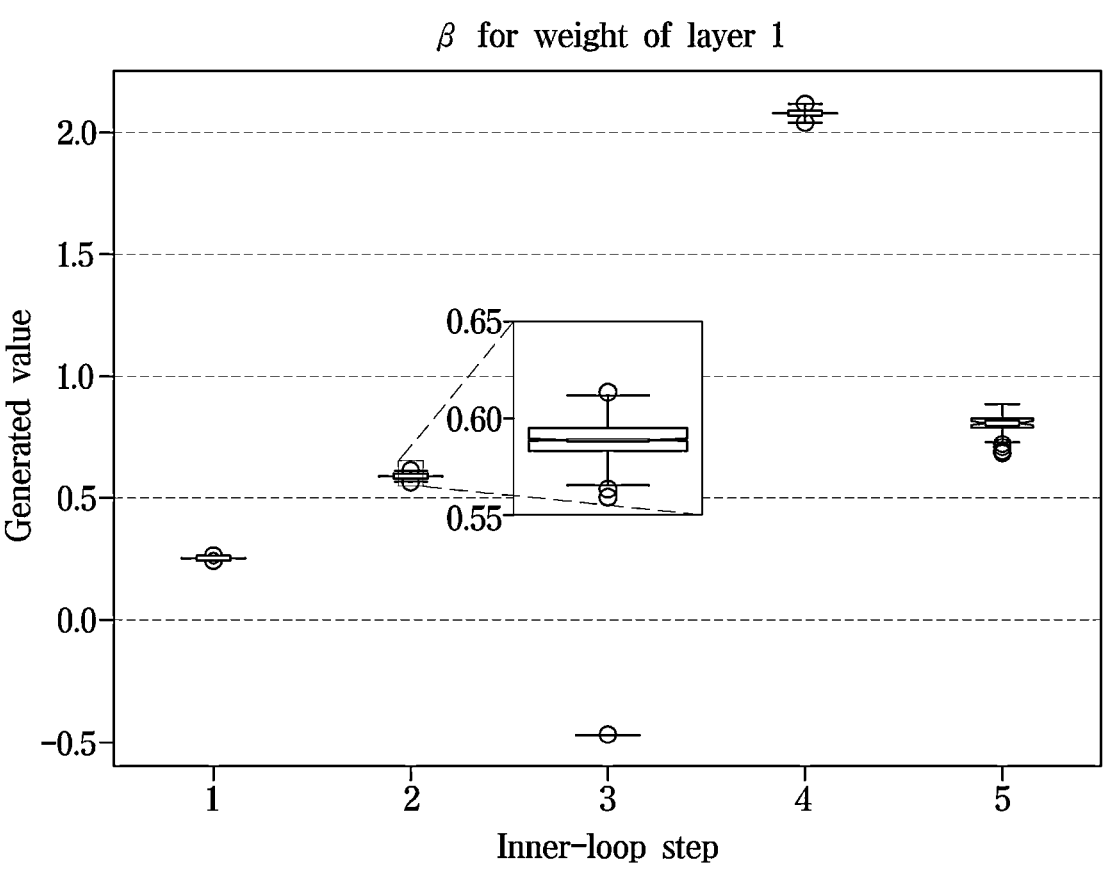

FIG. 12, and FIG. 13 are graphs illustrating affine transformation parameters generated by a learning method according to an exemplary embodiment of the present disclosure.

FIG. 12 is a graph illustrating the value of the affine transformation parameter $\gamma$ generated by the meta-learner g used in a process of training a model according to the learning method according to the exemplary embodiment of the present disclosure, and FIG. 13 is a graph illustrating the value of the affine transformation parameter $\beta$ generated by the meta-learner g used in a process of training a model according to the learning method according to an exemplary embodiment of the present disclosure.

As expressed in [Equation 7] above, the affine transformation parameters $\gamma$ and $\beta$ may be used to adapt the parameter $\varphi$ of the loss meta-learner l in a given task.

FIG. 12, and FIG. 13 are visualizations of values of parameters $\gamma$ and $\beta$ generated for a weight of a first layer of the loss meta-learner l. A change in values across multiple tasks was expressed as a boxplot.

Referring to the change in the values of parameters $\gamma$ and $\beta$ over the internal loop step illustrated in FIG. 12, and FIG. 13, it may be confirmed that the learning method according to an exemplary embodiment can dynamically adapt the loss function as the learning state changes in the internal loop optimization step.

Also, it may be confirmed that the values of the parameters ɣ and ß change according to the task, and the change is large in the last internal loop step. This may imply that the entire framework of the model being trained according to an exemplary embodiment of the present disclosure is trained to make the largest difference between tasks in the last step.

Furthermore, a dynamic range of affine transformation parameter values between tasks may prove the effectiveness of the learning method according to an exemplary embodiment of adapting the loss function for a given task.

FIG. 14 is a diagram illustrating an example of an electronic device according to an exemplary embodiment of the present disclosure.

An electronic device 200 according to various exemplary embodiments of the present disclosure may process various tasks using a model trained by the learning method according to the above-described embodiment. As an exemplary embodiment of the present disclosure, a classification task such as an image may be processed.

Referring to FIG. 14, the electronic device 200 according to various exemplary embodiments of the present disclosure may be implemented as a server, a mobile device, or a personal computer.

To process tasks using the trained model, a trained model is stored in the memory of the electronic device 200 and the processor of the electronic device 200 may execute the stored model.

Alternatively, the trained model is stored in a server, and the electronic device 200 communicates with the server through a communication module to use the trained model.

In the learning method using meta-learning described so far, the model is trained based on the few-shot learning, but does not use a fixed loss function for all tasks, but utilizes a task-adaptive loss function which is trained for each task, further improving the performance of the model.

As described above, by use of different loss functions each task, performance degradation may be prevented even if there is a large difference between domains during learning and inference.

Furthermore, in adapting the parameters of the loss function, it is possible to reduce the burden of determination by applying the affine transform instead of the time-consuming gradient descent method.

Meanwhile, the included learning method may be stored in a form of instructions in a recording medium storing instructions executable by a computer. That is, the instructions for performing the learning method according to various exemplary embodiments of the present disclosure may be stored in the recording medium.

The instructions may be stored in a form of program code, and upon executing the instructions by a processor, the operations of the disclosed exemplary embodiments of the present disclosure may be conducted.

The recording medium may be implemented as a computer-readable recording medium, where the recording medium is a non-transitory computer-readable medium for storing data non-transitory.

The computer-readable recording medium includes all types of recording media storing instructions readable by a computer. Examples of the computer-readable recording medium include a read only memory (ROM), a random access memory (RAM), a magnetic tape, a magnetic disk, a flash memory, an optical data storage device, or the like.

According to a method for training a model using a meta-learning method according to an exemplary embodiment and a computer-readable recording medium in which a program performing the same is recorded, a model optimized for each task may be obtained by independently training a loss function for each given task.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for training a model using a meta-learning, the method comprising:
training a base learning model;
training a loss meta-learning model used as a loss function of the base learning model for each task; and
training a meta-learning model used to optimize a parameter of the loss meta-learning model,
wherein the loss meta-learning model includes multi-layer perceptron.

2. The method of claim 1, wherein the training the base learning model includes training the base learning model by use of the loss meta-learning model trained for each task as the loss function.

3. The method of claim 1, wherein the training the base learning model includes:
generating output data of the base learning model by inputting input data of a support set to the base learning model; and
defining a task state based on the output data of the base learning model and target output data of the support set.

4. The method of claim 3, wherein the training the loss meta-learning model for each task includes:
generating output data of the meta-learning model by inputting the task state to the meta-learning model;
updating the parameter of the loss meta-learning model by use of the output data of the meta-learning model.

5. The method of claim 4, wherein the training the base learning model includes:
determining a loss value by inputting the task state to the loss meta-learning model in which the parameter is updated; and updating a parameter of the base learning model in a direction of minimizing the determined loss value.

6. The method of claim 4, wherein the updating the loss meta-learning model includes using an affine transformation, and the output data of the meta-learning model includes affine transformation parameters.

7. The method of claim 1, wherein the training the base learning model and the training the loss meta-learning model for each task are included in an internal loop, and the training the meta learning model is included in an external loop.

8. The method of claim 7, wherein the internal loop is configured to:

generate the output data of the base learning model by inputting input data of a query dataset to the base learning model for each task in response to a parameter of the base learning model being updated a predetermined number of times;

determine an elementary loss value based on the output data of the base learning model for each task; and sum the elementary loss value determined for each task.

9. The method of claim 8, wherein the external loop is configured to:

update the parameter of the base learning model, the parameter of the loss meta-learning model, and a parameter of the meta-learning model in a direction of minimizing the summed elementary loss value.

10. A non-transitory computer-readable recording medium in which a program for executing a method for training a model using a meta-learning is stored, wherein the method comprises:

training a base learning model;

training a loss meta-learning model used as a loss function of the base learning model for each task;

training a meta-learning model used to optimize a parameter of the loss meta-learning model, wherein the loss meta-learning model includes multi-layer perceptron.

11. The non-transitory computer-readable recording medium of claim 10, wherein the training the base learning model includes training the base learning model by use of the loss meta-learning model trained for each task as the loss function.

12. The non-transitory computer-readable recording medium of claim 11, wherein the training the base learning model includes:

generating output data of the base learning model by inputting input data of a support set to the base learning model; and defining a task state based on the output data of the base learning model and target output data of the support set.

13. The non-transitory computer-readable recording medium of claim 12, wherein the training the loss meta-learning model for each task includes:

generating output data of the meta-learning model by inputting the task state to the meta-learning model;

updating the parameter of the loss meta-learning model by use of the output data of the meta-learning model.

14. The non-transitory computer-readable recording medium of claim 13, wherein the training the base learning model includes:

determining a loss value by inputting the task state to the loss meta-learning model in which the parameter is updated; and updating a parameter of the base learning model in a direction of minimizing the determined loss value.

15. The non-transitory computer-readable recording medium of claim 13, wherein the updating the loss meta-learning model includes using an affine transformation, and the output data of the meta-learning model includes affine transformation parameters.

16. The non-transitory computer-readable recording medium of claim 10, wherein the training the base learning model and the training the loss meta-learning model for each task are included in an internal loop, and the training the meta learning model is included in an external loop.

17. The non-transitory computer-readable recording medium of claim 16, wherein the training the meta-learning model includes:

generating the output data of the base learning model by inputting input data of a query dataset to the base learning model for each task in response to a parameter of the base learning model being updated a predetermined number of times; and determining an elementary loss value based on the output data of the base learning model for each task.

18. The non-transitory computer-readable recording medium of claim 17, wherein the training the meta-learning model further includes summing the elementary loss value determined for each task, and updating the parameter of the base learning model, the parameter of the loss meta-learning model, and a parameter of the meta-learning model in a direction of minimizing the summed elementary loss value.

* * * * *